(12) United States Patent
Lai

(10) Patent No.: US 8,026,451 B2
(45) Date of Patent: Sep. 27, 2011

(54) ELECTRONIC DEVICE CAPABLE OF EJECTING AN EXTERNAL DEVICE

(75) Inventor: Chun-Chiang Lai, Taipei (TW)

(73) Assignee: Wistron Corp., Taipei (TW)

( * ) Notice: Subject to any disclaimer, the term of this patent is extended or adjusted under 35 U.S.C. 154(b) by 234 days.

(21) Appl. No.: 12/431,417

(22) Filed: Apr. 28, 2009

(65) Prior Publication Data
US 2010/0208423 A1 Aug. 19, 2010

(30) Foreign Application Priority Data
Feb. 17, 2009 (TW) ................................ 98104937 A

(51) Int. Cl.
*H05K 7/14* (2006.01)
(52) U.S. Cl. .................................. 174/542; 361/679.38
(58) Field of Classification Search .................. 174/520, 174/542; 361/679.38, 679.39, 726, 727
See application file for complete search history.

(56) References Cited

U.S. PATENT DOCUMENTS

| | | | | |
|---|---|---|---|---|
| 6,137,685 A * | 10/2000 | Morinaga | ...................... | 361/727 |
| 6,538,972 B1 * | 3/2003 | Poulsen | ......................... | 720/638 |
| 6,643,139 B2 * | 11/2003 | Tien | ............................... | 361/727 |
| 6,912,132 B2 * | 6/2005 | Riddiford et al. | ............. | 361/727 |
| 6,992,886 B2 * | 1/2006 | Salinas et al. | ............. | 361/679.38 |
| 7,088,778 B2 * | 8/2006 | Barrett et al. | ................. | 375/242 |
| 7,679,899 B2 * | 3/2010 | Hsieh et al. | ............. | 361/679.38 |
| 7,755,888 B2 * | 7/2010 | Sun | ......................... | 361/679.38 |
| 7,848,099 B1 * | 12/2010 | Zhang et al. | ............. | 361/679.38 |
| 2002/0089821 A1 * | 7/2002 | Weng et al. | .................... | 361/685 |
| 2003/0030991 A1 * | 2/2003 | Riddiford et al. | ............. | 361/724 |
| 2003/0112597 A1 * | 6/2003 | Smith | ........................... | 361/685 |
| 2005/0111178 A1 * | 5/2005 | Bradley et al. | ................ | 361/684 |
| 2008/0186624 A1 | 8/2008 | Chuang et al. | | |

FOREIGN PATENT DOCUMENTS

TW M289538 4/2006
TW 200824531 A 6/2008
* cited by examiner

*Primary Examiner* — Hung V Ngo
(74) *Attorney, Agent, or Firm* — Muncy, Geissler, Olds & Lowe, PLLC

(57) ABSTRACT

The present invention provides an electronic device having a ejector for an external device. The ejector includes a body, a first elastic member, a plate, a block, a rotating unit, and a second elastic member. The ejector of the present invention is able to eject the external device engaged therewith. Thus, the apparatus can be applied to an electronic device required for detaching the external device.

14 Claims, 19 Drawing Sheets

ELECTRONIC DEVICE CAPABLE OF EJECTING AN EXTERNAL DEVICE

This application claims the priority based on a Taiwanese Patent Application No. 098104937, filed on Feb. 17, 2009, the disclosure of which is incorporated herein by reference in its entirety.

BACKGROUND OF THE INVENTION

1. Field of the Invention

The present invention generally relates to an ejector. Particularly, the present invention relates to an electronic device capable of ejecting an external device.

2. Description of the Prior Art

Conventional electronic devices usually have an engaging mechanisms for an external device (e.g. hard disk drive, HDD), but without any ejector for ejecting the external device. Thus, users have to withdraw the external device from the electronic device manually. Such operation is not convenient to users, especially when the external device is embedded in the electronic device (e.g. inside the housing). Since the configuration of the electronic device may be very complicated and/or no appropriate mechanism is provided for ejecting the external device, manually withdrawing the external device is difficult or even possible to damage the electronic device.

Due to the drawbacks of conventional engaging design, operation of the electronic device becomes complicated and only a few people (e.g. professionals) can operate properly. Based on the above-identified drawbacks, the present inventor contemplates and studies, based on rationales, to overcome those drawbacks and provide a reasonable design for improvement.

SUMMARY OF THE INVENTION

It is an object of the present invention to provide an ejector, which allows users to eject an external device in a convenient way. Thus, people without sufficient strength (e.g. children or senior citizens) are able to use the ejector to eject the external device away from an electronic device.

It is a further object of the present invention to provide an electronic device capable of ejecting an external device. With the use of the ejector, the electronic device and the external device can be easily engaged or disengaged.

In one embodiment, the electronic device having an ejector for an external device includes a body having a housing, a first elastic member, a plate, a first block, a first rotating unit, and a second elastic member. The first block includes a first engaging part and a first pin. The first rotating unit has a first base part and a first stem part. The first base part is formed with a first notch engaging with the first engaging part. The plate has a first end and a second end. The first end connects to a button. By pressing the button, the plate moves from a first location to a second location. Moreover, the plate has at least one guiding slot, in which at least a pin of a block is inserted. When the plate moves from the first location to the second location, the sidewall of the guiding slot guides the pin to move from a first end of the guiding slot to a second end of the guiding slot. Consequently, while the guiding slot guides the block to move, the notch is disengaged from the first engaging part. Therefore, the first stem part, which is moveable and driven by the second elastic member, moves from a third location to a fourth location so as to allow the ejector to eject the external device.

The first block has the first engaging part and the pin. The pin is movably disposed in the guiding slot. Thus, the moving direction of the first block is restrained by the guiding slot. The first rotating unit has a first stem part and a first base part formed with a first notch. The first notch of the first rotating unit is corresponding to the first block. In other words, the first notch is disposed on the first rotating unit close to the first block. Thus, the first notch of the first rotating unit detachably engages with the first engaging part of the first block. After the first engaging part disengages from the notch, the first rotating unit is released from the restraints of the first engaging part. In other words, by controlling the engagement/disengagement status of the first notch and the first engaging part, the first rotating unit could be selectively free from the control of the first engaging part. Besides, the first stem part is disposed perpendicular to the base surface of the first rotating unit. In other words, the first stem part protrudes from the base surface of the first rotating unit, or a vertical bending structure serving as the first stem part is formed on the edge of the first rotating unit. Therefore, when the first rotating unit actuates, the first rotating unit acts to drive the first stem part to disengage an object (e.g. the external device) from the housing of the body.

The second elastic member includes a first end and a second end. The second end is connected to the first rotating unit. When the first notch and the first engaging part are disengaged in guidance of the guiding slot, the torsion of the spring will drive the first rotating unit to rotate and drive the first stem part to eject the external device from the housing of the body.

DETAILED DESCRIPTION OF THE PREFERRED EMBODIMENT

In one embodiment of the invention, an electronic device with an ejector capable of ejecting an external device is provided. The ejector is preferrably applied to portable electric devices (e.g. laptops), electronic dictionaries, global positioning system (GPS) devices, game stations, portable music players, displays, or other electronic devices which are in need of ejecting a detachable device. The ejector of the present invention is preferably used for ejecting an external device such as 2.5 inch hard disk drive, 3.5 inch hard disk drive, flash drive, or other peripheral devices.

Figure 1A:
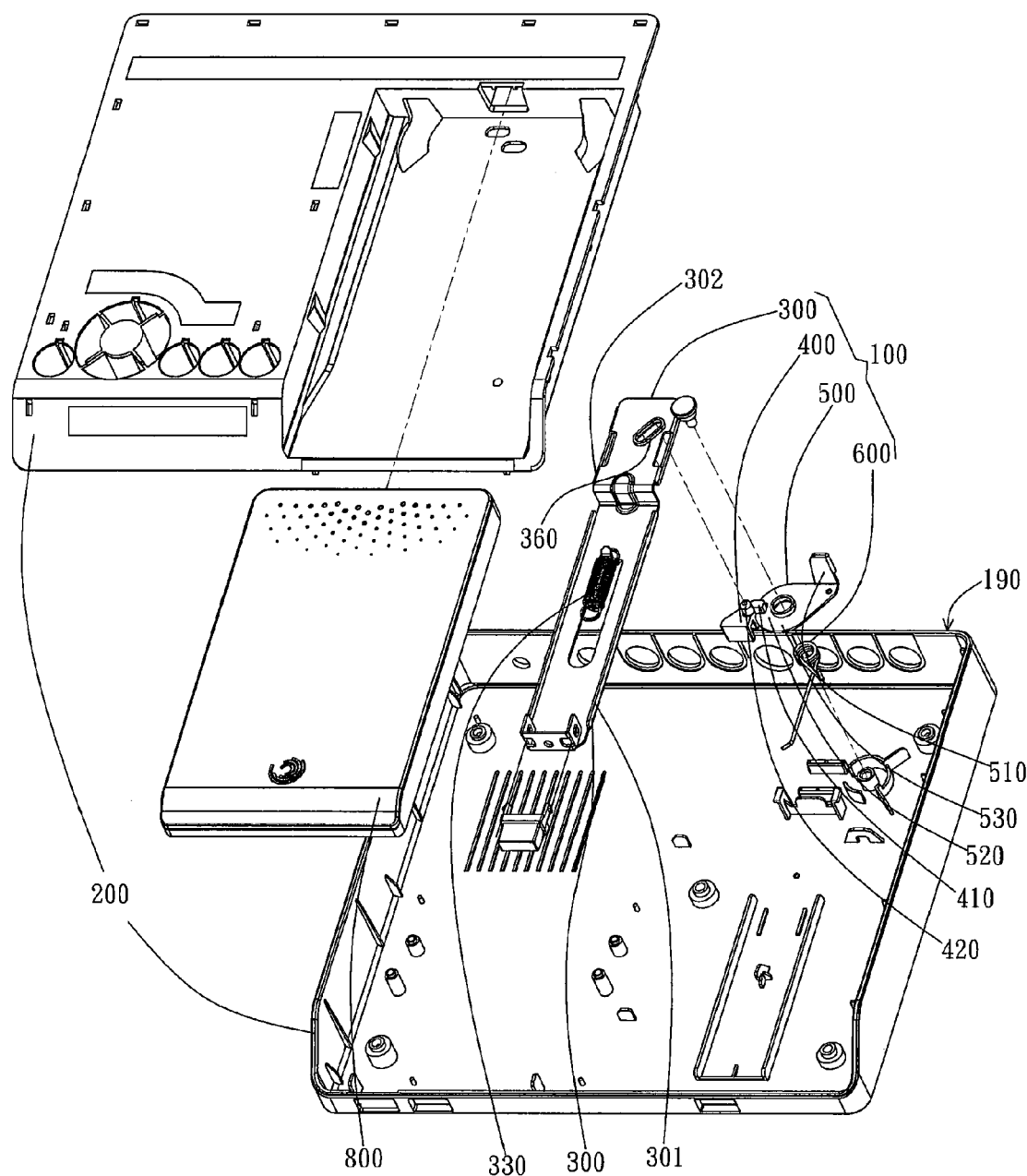
FIG. 1A shows an exploded view of a ejector of an embodiment of the present invention.

In an exploded view shown in FIG. 1A, the electronic device 700 uses the ejector 100 to eject the external device 800 from the electronic device 700. The electronic device 700 includes a body 190 having a housing 200, a first elastic member 330, a plate 300, a first block 400, a first rotating unit 500, and a second elastic member 600. The plate 300 includes a first end 301 and a second end 302. The second end 302 has at least one guiding slot 360. In this embodiment, the first elastic member 330 includes an extension spring. The plate 300 is connected to the housing 200 of the body 190 through the first elastic member 330, i.e. the extension spring.

Figure 1B:
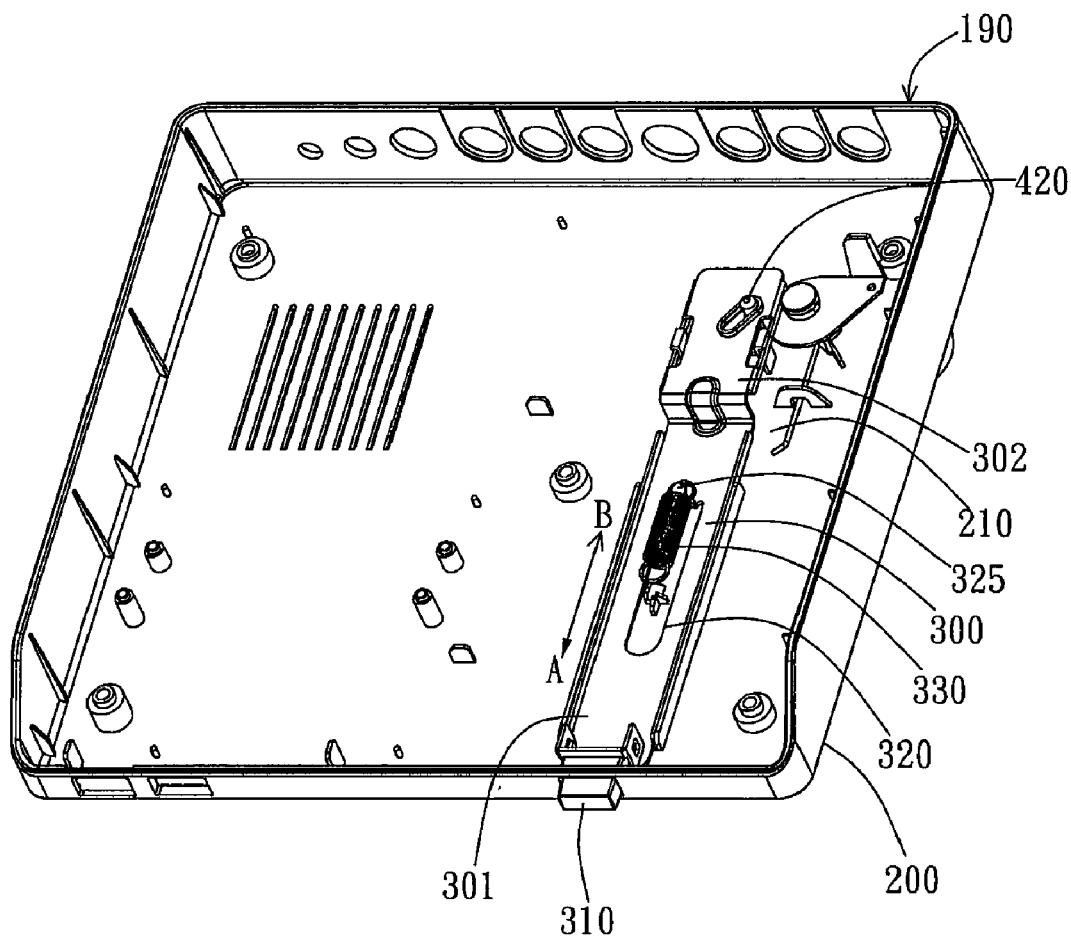
FIG. 1B illustrates an embodiment of an assembled plate.
Figure 1C:
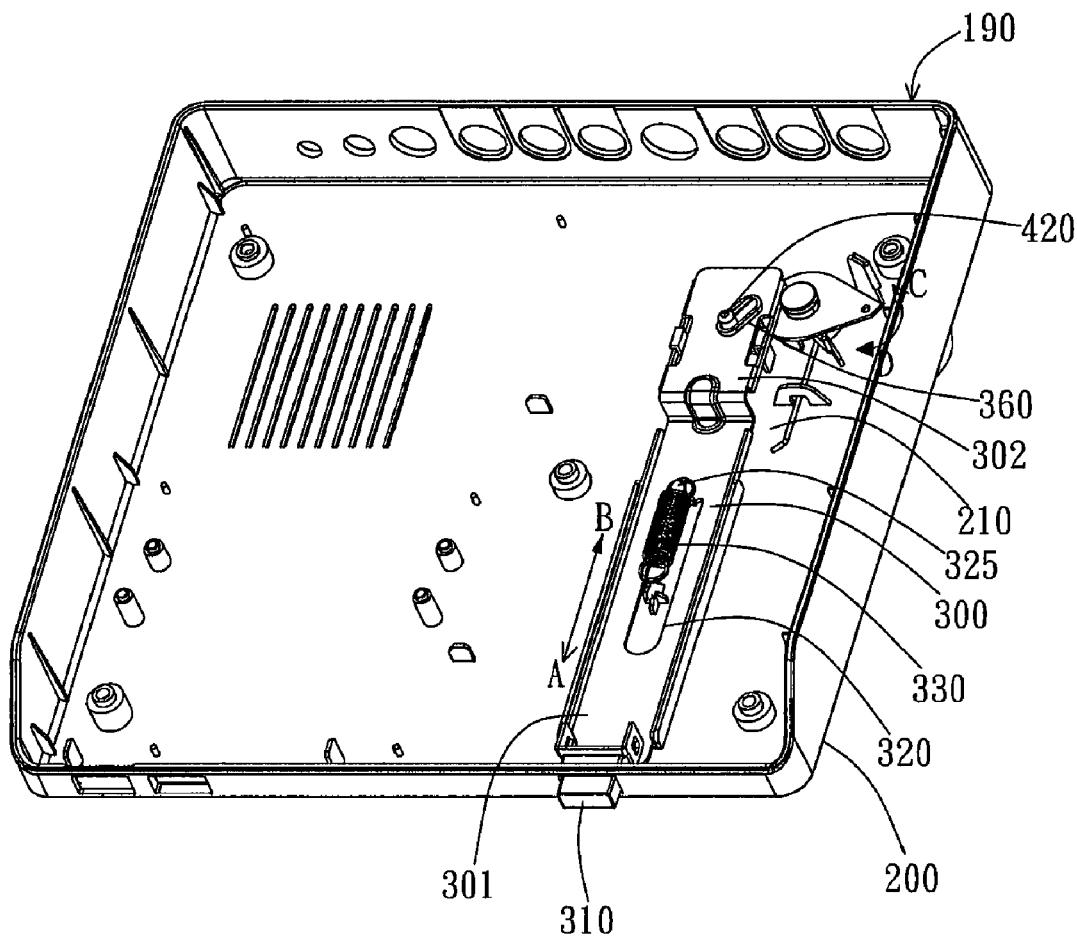
FIG. 1C illustrates an embodiment of a shifting of a plate.

In the embodiments shown in FIG. 1B and FIG. 1C, the first end 301 of the plate 300 connects to a button 310. In this embodiment, the button 310 is extended from the plate 300 integrally or in an attached manner. IAs FIG. 1B and FIG. 1C show, the plate 300 has a first opening 320 between the first end 301 and the second end 302. The first opening 320 is formed to accommodate the first elastic member 330. Thus, the first elastic member 330 connects to the plate 300 and the housing 200 of the body 190 via the first opening 320. In the embodiments shown in FIG. 1B and FIG. 1C, one end of the first elastic member 330 connects to a protruding portion 325 disposed on the plate 300 and adjacent to the edge of the first opening 320 while the other end of the extension spring 330 connects to a surface 210 of the housing 200 of the body 190. In the embodiment shown in FIG. 1B, the first elastic member 330 provides an elastic force to maintain the plate 300 or the ejector at a first location A.

Figure 1D:
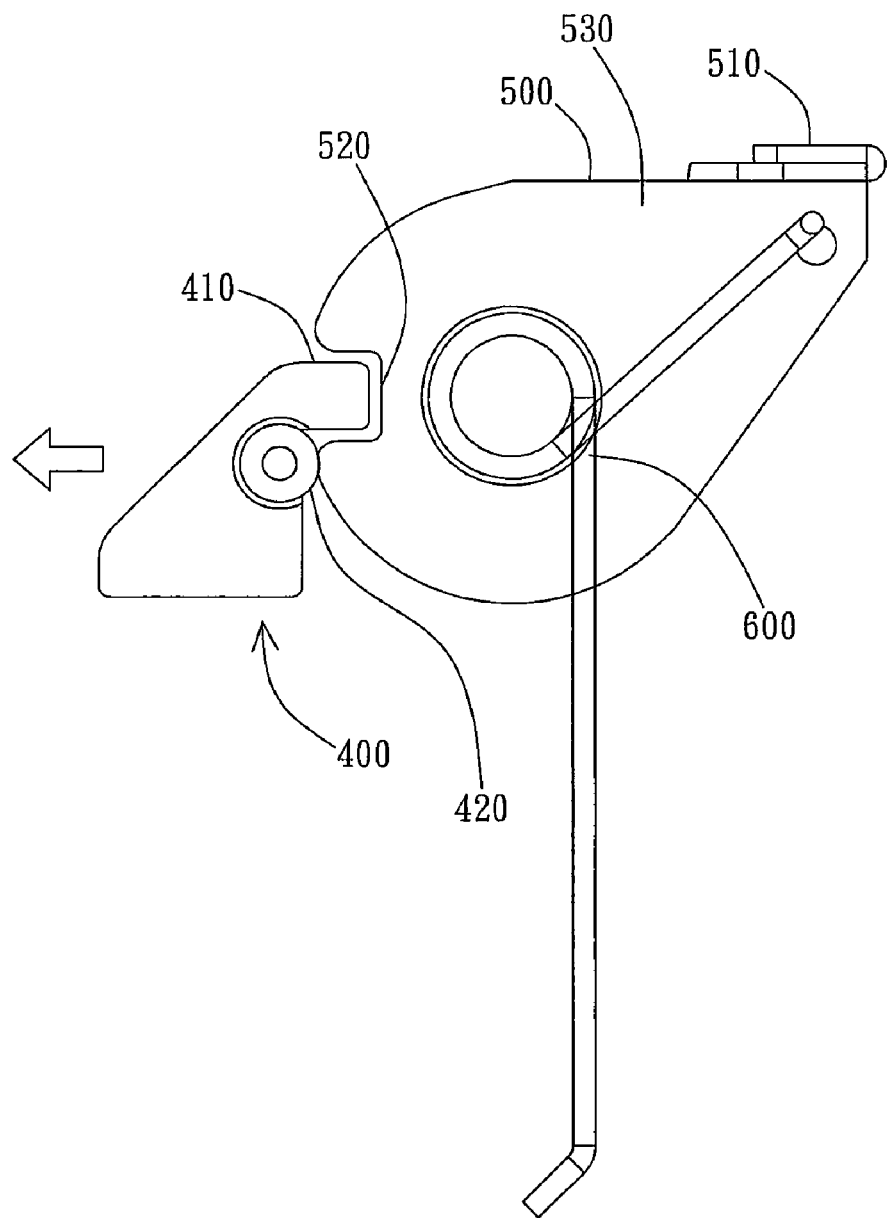
FIG. 1D illustrates an embodiment of a first rotating unit at a first location.
Figure 1E:
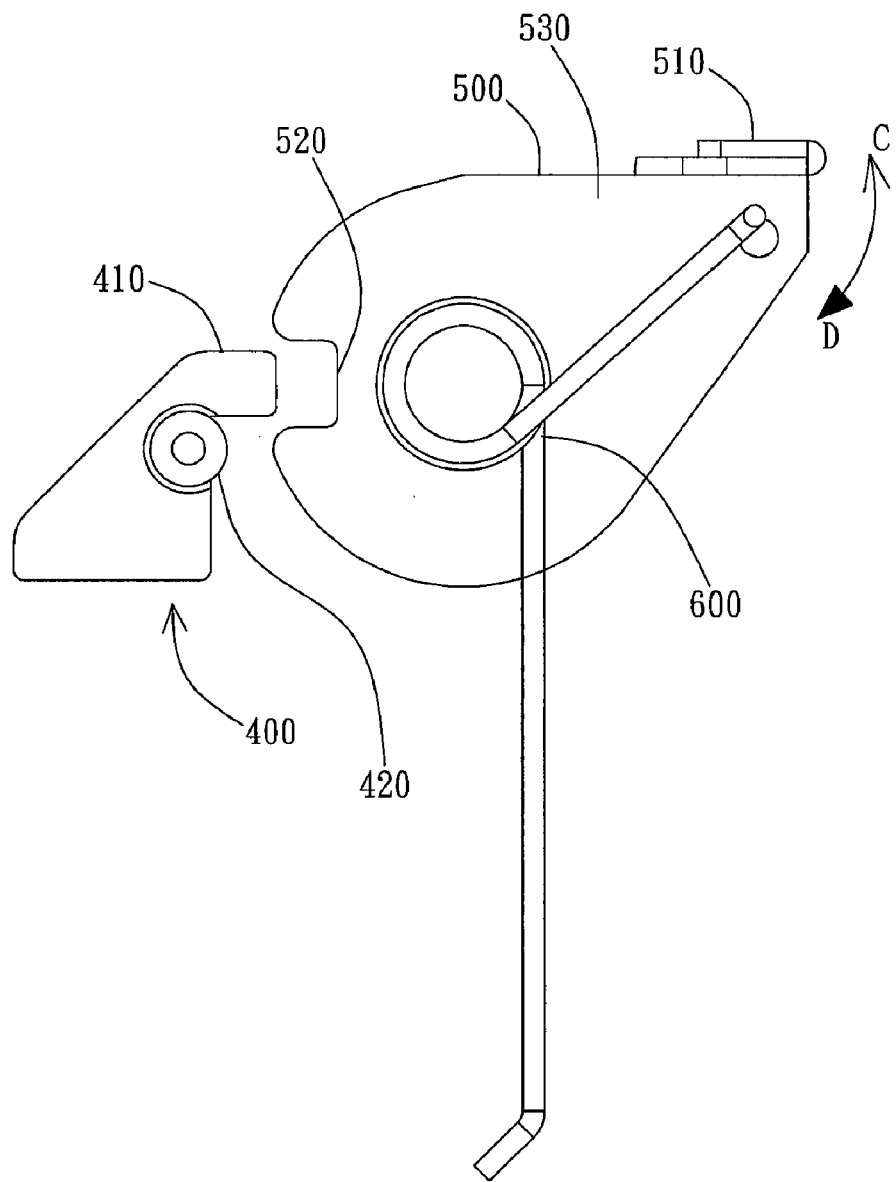
FIG. 1E illustrates an embodiment of the first rotating unit at a second location.
Figure 1F:
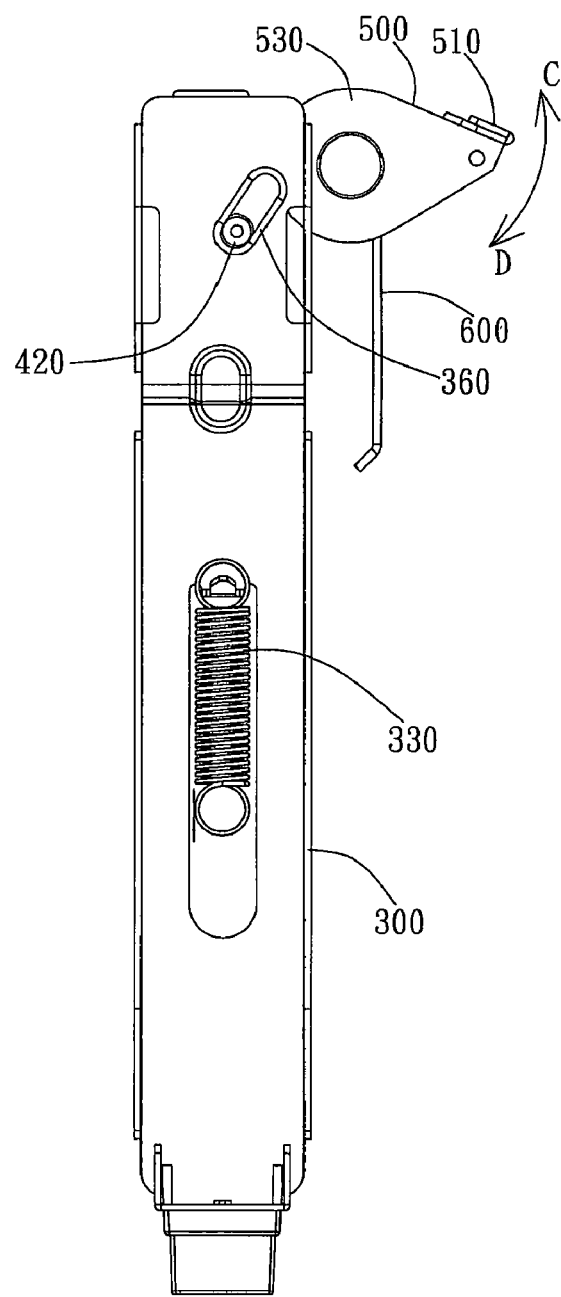
FIG. 1F illustrates an embodiment of operations of an ejector.

As shown in FIG. 1B and FIG. 1C, the plate 300 is movable between the first location A and a second location B. When the plate 300 moves from the first location A to the second location B, a first pin 420 of the first block 400 correspondingly moves from the first end of the guiding slot 360 (shown in FIG. 1B) to the second end of the guiding slot 360 (shown in FIG. 1C). In turn, with reference to FIG. 1D and FIG. 1E, a first notch 520 and a first engaging part 410, which are in engaged in FIG. 1D, are disengaged accordingly (shown in FIG. 1E). In other words, when a user presses the button 310 to drive the plate 300 to move from the first location A to the second location B, the first block 400 is laterally shifted to release the first engaging part 410 from the first notch 520. As such, the first rotating unit 500 is disengaged from the first block 400. With reference to FIG. 1E, the shape of the notch 520 corresponds to the shape of the first engaging part 410; however, the shape of the first engaging part 410 is not limited to this embodiment. With reference to FIG. 1F, in the separation/disengagement status, the first engaging part 410 releases the first rotating unit 500 from restraint. In the meantime, a first stem part 510 connected to a first base part 530 is driven by the second elastic member 600, e.g. a spring, to move from a third location C to a fourth location D. When the first stem part 510 moves to the fourth location D, the momentum of the first stem part 510 ejects the external device 800 from the electronic device.

Figure 2A:
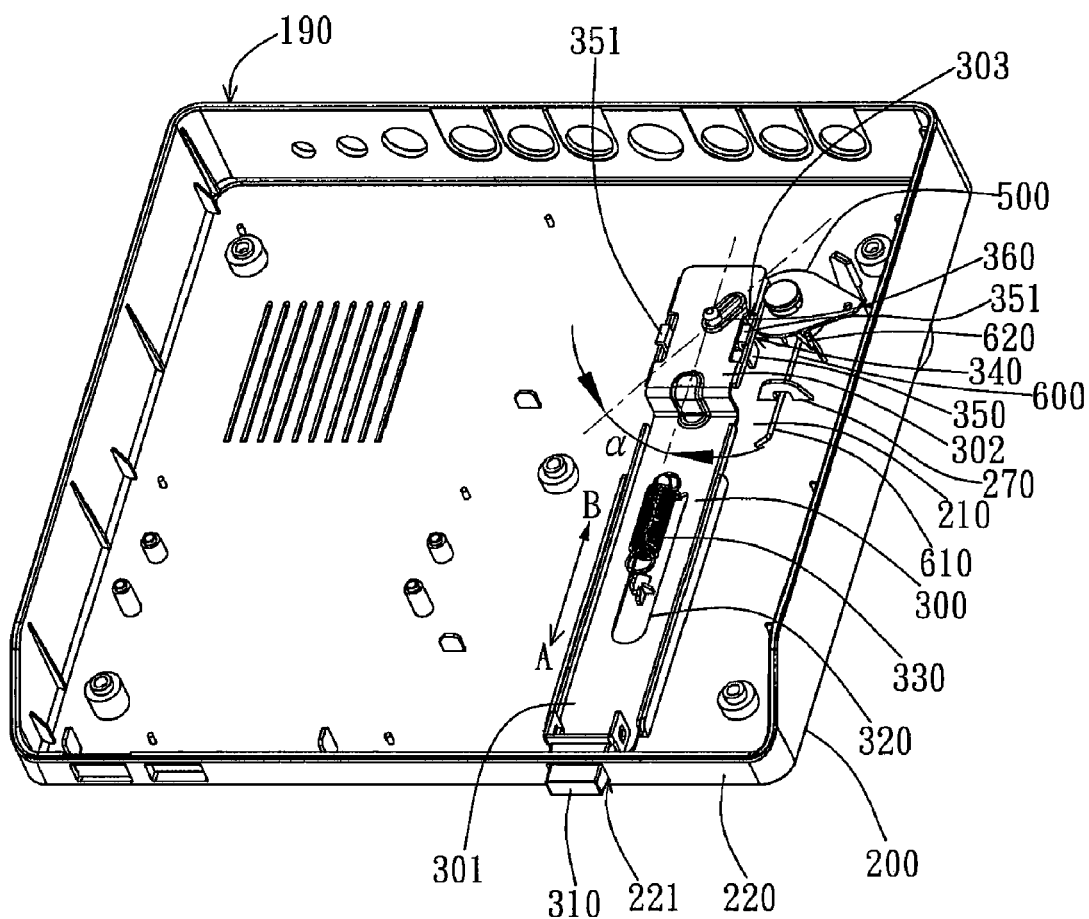
FIG. 2A illustrates an embodiment of an ejector in accordance with an embodiment.

In the embodiment shown in FIG. 2A, the second end 302 of the plate 300 bends upwardly. In this case, the bending structure is preferably an L shape, but not limited thereto. An accommodation space 340 is formed between the plate 300 and the surface 210 of the housing 200 of the body 190 due to the bending structure. In the embodiment shown in FIG. 2A, the accommodation space 340 receives a engaging part 350. One end of the engaging part 350 is disposed on the surface 210 of the housing 200 of the body 190 while the other end of the engaging part 350 engages with the plate 300 to restrain the plate 300 but allow it moving between the first location A and the second location B. Particularly, in the embodiment shown in FIG. 2A, the engaging part 350 has a plate guide 351 on one side. The plate guide 351 is slidably inserted into a second groove 303 of the plate 300. The second groove 303 is formed on the plate 300 corresponding to the engaging part 350. In other words, by the engagement between the plate guide 351 and the second groove 303, the vertical movement of the plate 300 is limited. Besides, since the length of the second groove 303 is longer than the length of the plate guide 351, the horizontal displacement of the plate 300 (i.e. the movement between the first location A and the second location B) is not restrained by the plate guide 351. Moreover, the length of the second groove 303 can be modified to limit the horizontal displacement of the plate 300. In other words, the present invention is capable of limiting the horizontal displacement of the plate 300 (i.e. a distance between the location A and the location B) by modifying the length of the second groove 303.

In the embodiment shown in FIG. 2A, the engaging part 350 further acts to stabilize the plate 300 and prevent the plate 300 from disengaging from the surface 210 of the housing 200. Besides, in the embodiment shown in FIG. 2A, a surface of the housing 200 corresponding to a touch surface 220 of the button 310 is formed with a second opening 221. The button 310 protrudes from an external surface of the housing 200 of the body 190 through the second opening 221. In other words, the button 310 can be a part of the plate 300, which extends out and penetrates the housing 200 through the second opening 320. Thus, the user is allowed to press the button 310 and drive the plate 300 to move from the first location A to the second location B. In the embodiment shown in FIG. 2A, the plate 300 has at least one guiding slot 360. Particularly, the guiding slot 360 is disposed on the second end 302 of the plate 300. An included angle α is formed between the extending direction of the guiding slot 360 and the moving direction of the plate 300. Please note, the included angle α is not limited to this embodiment. With the design of the included angle α, when the plate 300 moves from the first location A to the second location B, the first block 400 laterally shifts to disengage from the first rotating unit 500. In the meantime, the plate 300 is positioned on the second location B, and the first pin 420 of the first block 400 is position on the second end of the guiding slot 360.

Figure 2B:
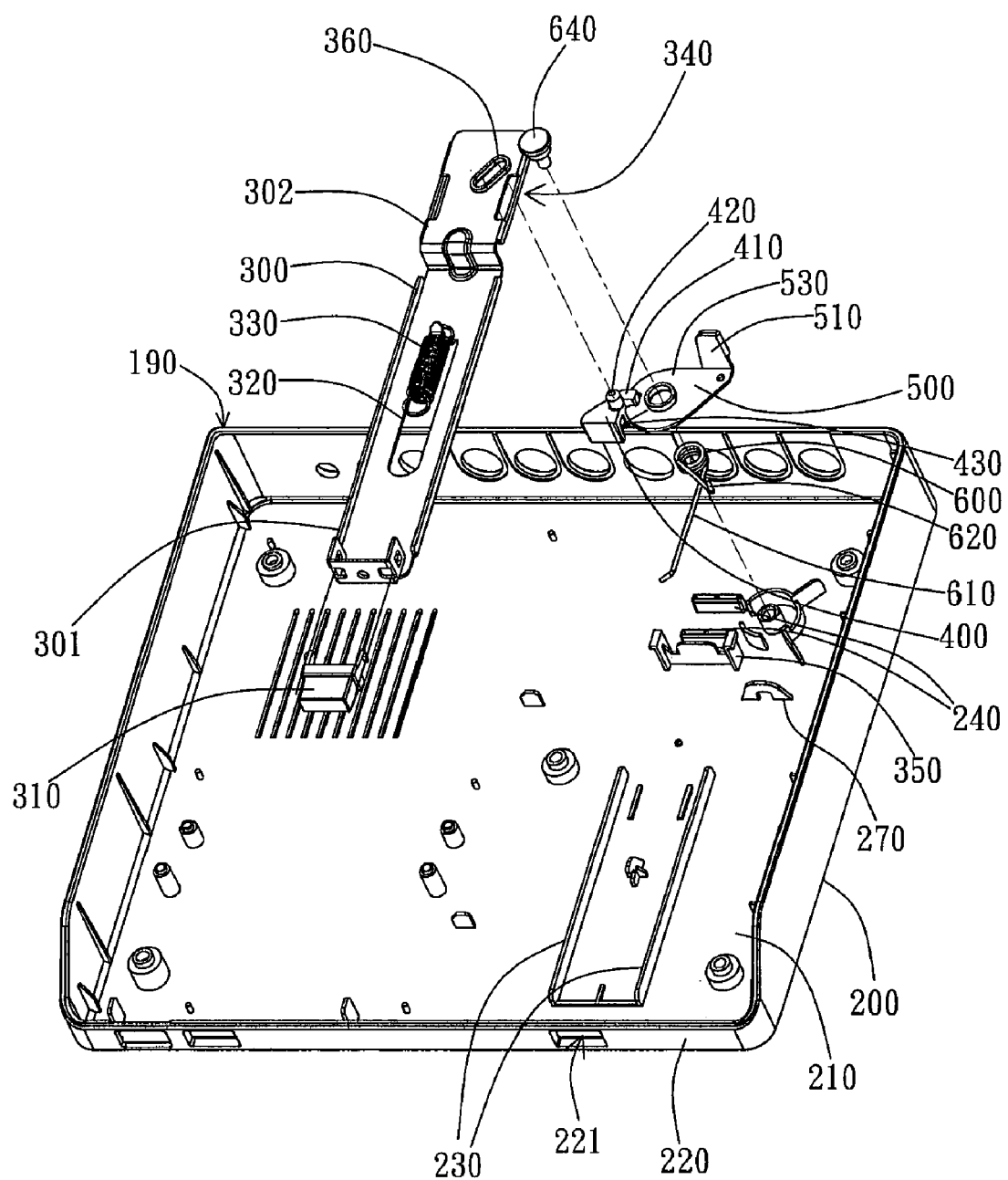
FIG. 2B shows an exploded view of an ejector in accordance with an embodiment.
Figure 2C:
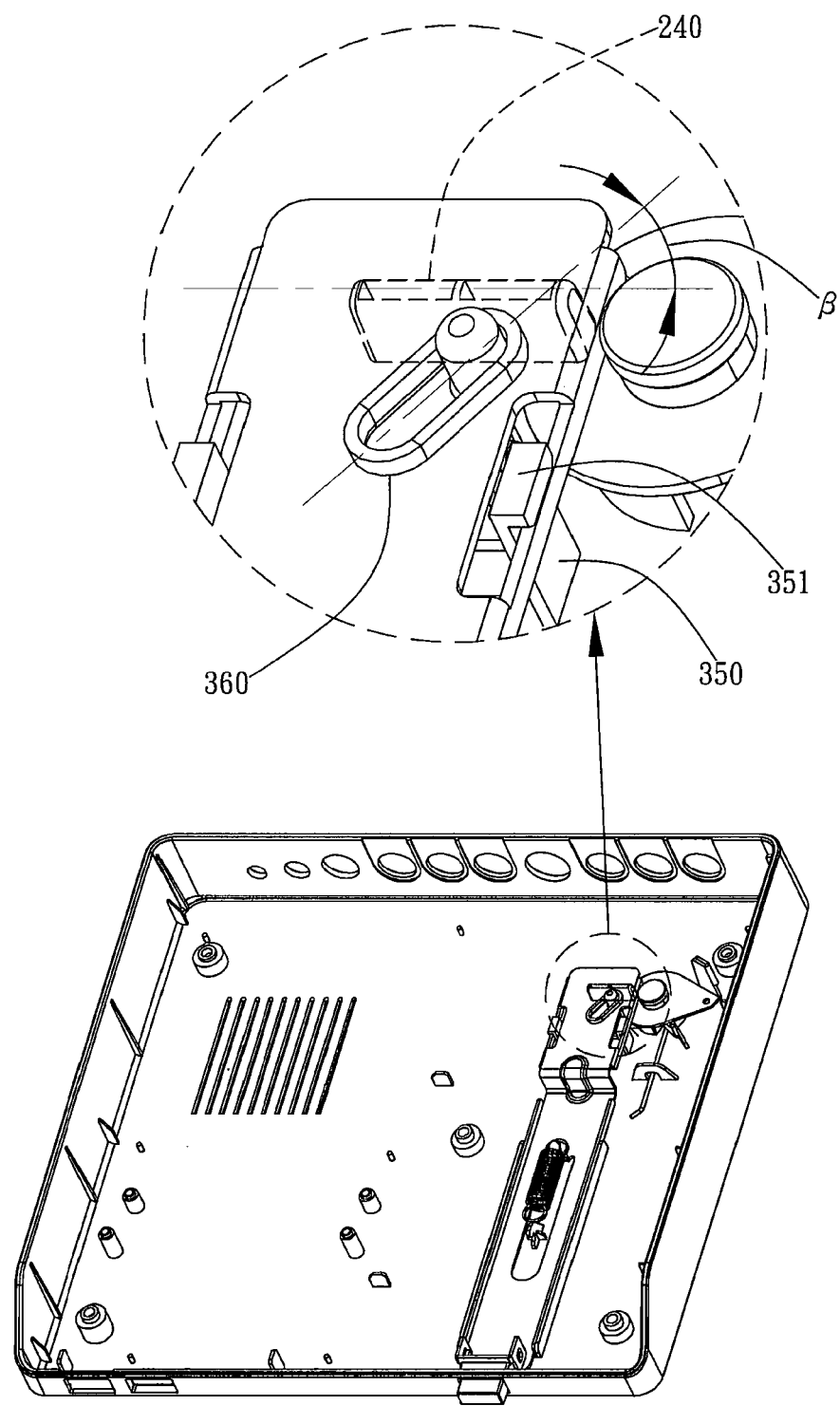
FIG. 2C illustrates an embodiment of an included angle between a guide plate and a guiding slot.
Figure 2D:
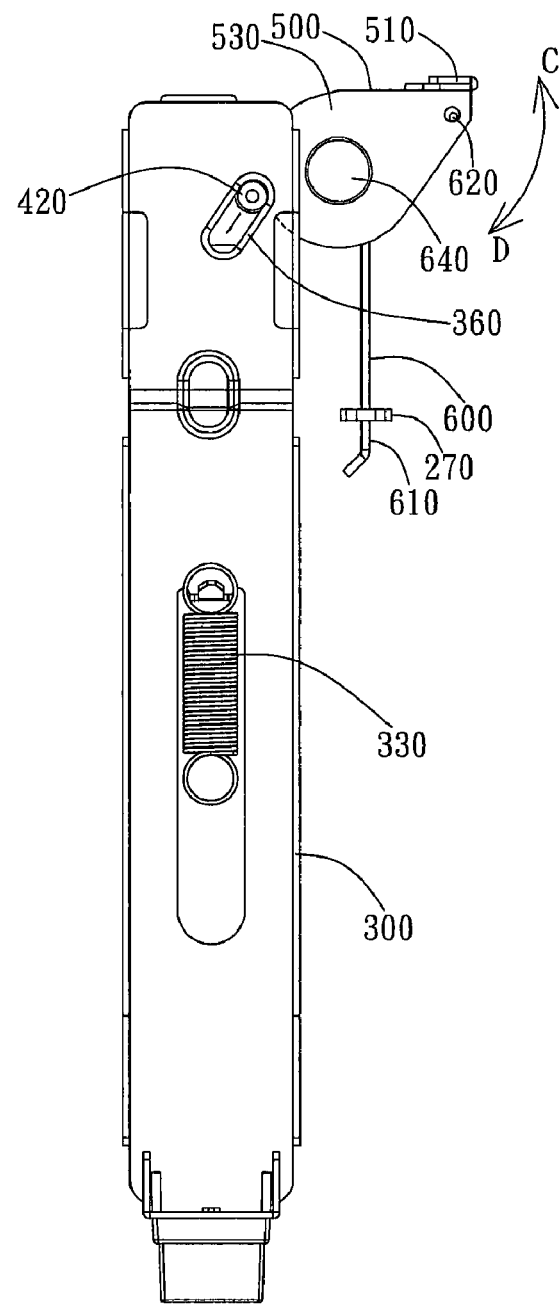
FIG. 2D illustrates an exemplary operation of a ejector in accordance with an embodiment.

In the embodiment shown in FIG. 2B, a positioning groove 230 is formed on the surface 210 of the housing 200 of the body 190. The positioning groove 230 acts to guide the moving direction of the plate 300. In other words, the plate 300 moves between the first location A and the second location B along the positioning groove 230. Furthermore, in this embodiment, the first block 400 has the first engaging part 410 and the first pin 420. The first pin 420 is slidably disposed in the guiding slot 360. In the embodiment, the ejector further has a guide plate 240. The guide plate 240 is disposed on the surface 210 of the housing 200 of the body 190 corresponding to the plate 300 and engaging with first block 400. When the first pin 420 moves from the first end to the second end, the first block 400 is driven to move along the guide plate 240. In the embodiment, the first block 400 is disposed between the plate 300 and the housing 200 of the body 190. In other words, the first block 400 is disposed within the accommodation space 340. In this embodiment, the first block 400 is slidably coupled to the guide plate 240 and capable of shifting along the guide plate 240. Particularly, the first block 400 defines a groove 430 corresponding to the guide plate 240. The groove 430 slidably receives the guide plate 240 so that the first block 400 is allowed to move along the guide plate 240. With reference to FIG. 2C, an included angle β is formed between the guiding slot 360 and the guide plate 240. Therefore, by regulating the relative positions among the guiding slot 360, the guide plate 240, and the first block 400, the first block 400 is allowed to shift only along the lengthwise direction of the guide plate 240, instead of along a direction perpendicular to the lengthwise direction of the guide plate 240.

In the embodiment shown in FIG. 2B, the ejector further includes at least a shaft 640. The shaft 640 is connected to the first base part 530 and the second elastic member 600 (e.g. a spring). In this case, the second elastic member 600 is disposed between the first base part 530 and the housing 200 of the body 190. Because the shaft 640 (as a pivot point) acts to position the first base part 530 and the second elastic member 600, when the first stem part 510 is driven by the spring 600 to move from the third location C to the fourth location D, a rotating axle of the first stem part 510 and the shaft are coaxial. In the embodiments shown in FIG. 2A and FIG. 2B, the second elastic member 600 includes a first end 610 and a second end 620. The second end 620 is connected to the first base part 530 of the first rotating unit 500, and the first end 620 is connected to the surface 210 of the housing 200 of the body 190. In this embodiment, the housing 200 of the body 190 further includes a cannular protrusion 270. The first end 610 penetrates through the cannular protrusion 270 so as to fix the second elastic member 600 on the housing 200 of the body 190.

Figure 2E:
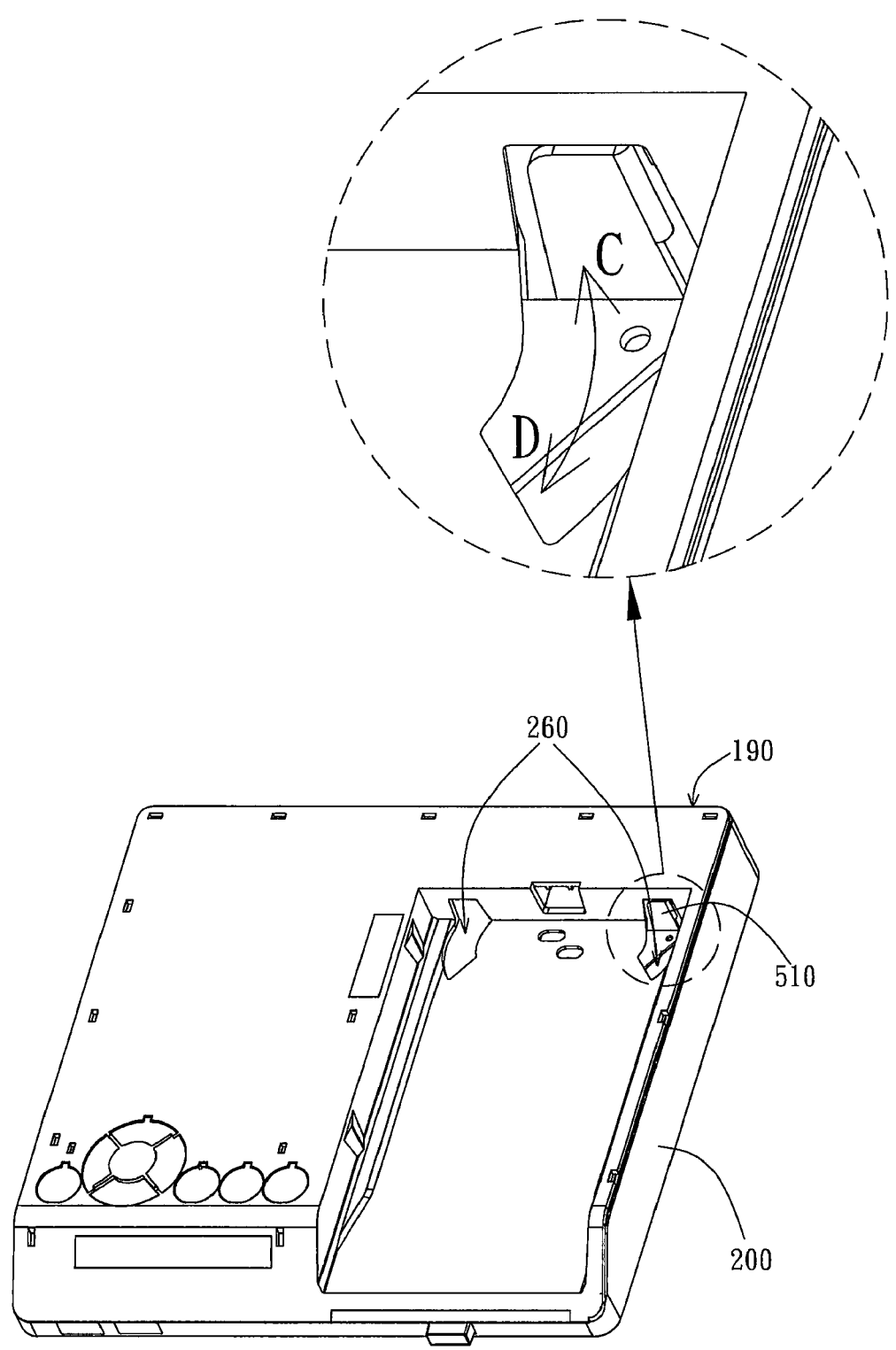
FIG. 2E shows a schematic view of operations of a ejector in a third opening.

In the embodiment shown in FIG. 2E, since the second end 620 and the first end 610 are fixed, the second elastic member 600 is capable of providing a recovering torsion force. In this embodiment, the first rotating unit 500 and the second elastic member 600 mainly receive external forces from the following three positions or joints: the connection between first end 610 and the cannular protrusion 270, the connection between the second end 620 and the first rotating unit 500, and the connection between the first notch 520 and the first engaging part 410. In this embodiment, the first stem part 510 is formed as a vertical bended structure on the edge of the first base part 530. In this embodiment, the shape of the first base part 530 is formed as a wing structure, but not limited thereto. When the first engaging part 410 disengages from the first notch 520, the connection therebetween is gone and the other two interacted connections remain, including the connection between the first end 610 and the housing 200 of the body 190 and the connection between the second end 620 and the first rotating unit 500. Therefore, the torque along the axle of the first rotating unit 500 and the spring 600 (i.e. where the shaft 640 is disposed) loses balance.

Consequently, the first rotating unit 500 and the second elastic member 600 move or rotate to regain the balance. When the first rotating unit 500 rotates, the first rotating unit 500 simultaneously drives the first stem part 510 to move. When the first stem part 510 moves from the third location C to the fourth location D to push against the external device 800, the external device 800 is ejected from the housing 200 of the body 190. In the embodiment shown in FIG. 2E, the housing 200 of the body 190 further includes at least a third opening 260 formed thereon. The first stem part 510 protrudes from the third opening 260 and moves from third location C to the fourth location D in the third opening 260.

One embodiment of the present invention achieves the purpose to eject the external device by the above-identified configuration of the ejector. Various embodiments are further described below.

Figure 3A:
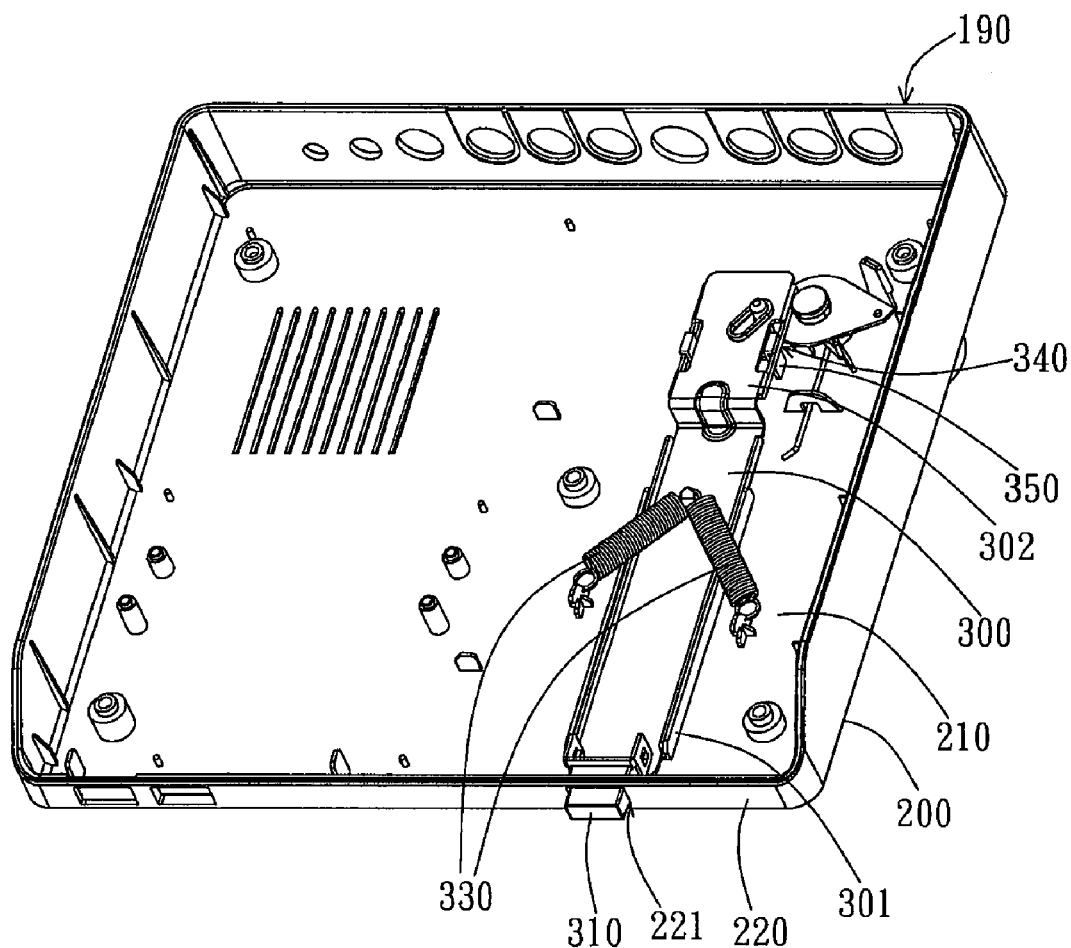
FIG. 3A shows a schematic view of a ejector in accordance with a first modified embodiment.

In the embodiment shown in FIG. 3A, the plate 300 does not include a first opening to accommodate the first elastic member 330. In this case, at least one extension spring 330 is disposed on the surface 210 of the housing 200 of the body 190 corresponding to the plate 300. Particularly, two extension springs 330 are correspondingly disposed on the surface 210 of the housing 200 of the body 190. The two extension springs 330 not only provides a tensile force, but also stabilize the ejector when a horizontal force is exerted thereon.

Figure 3B:
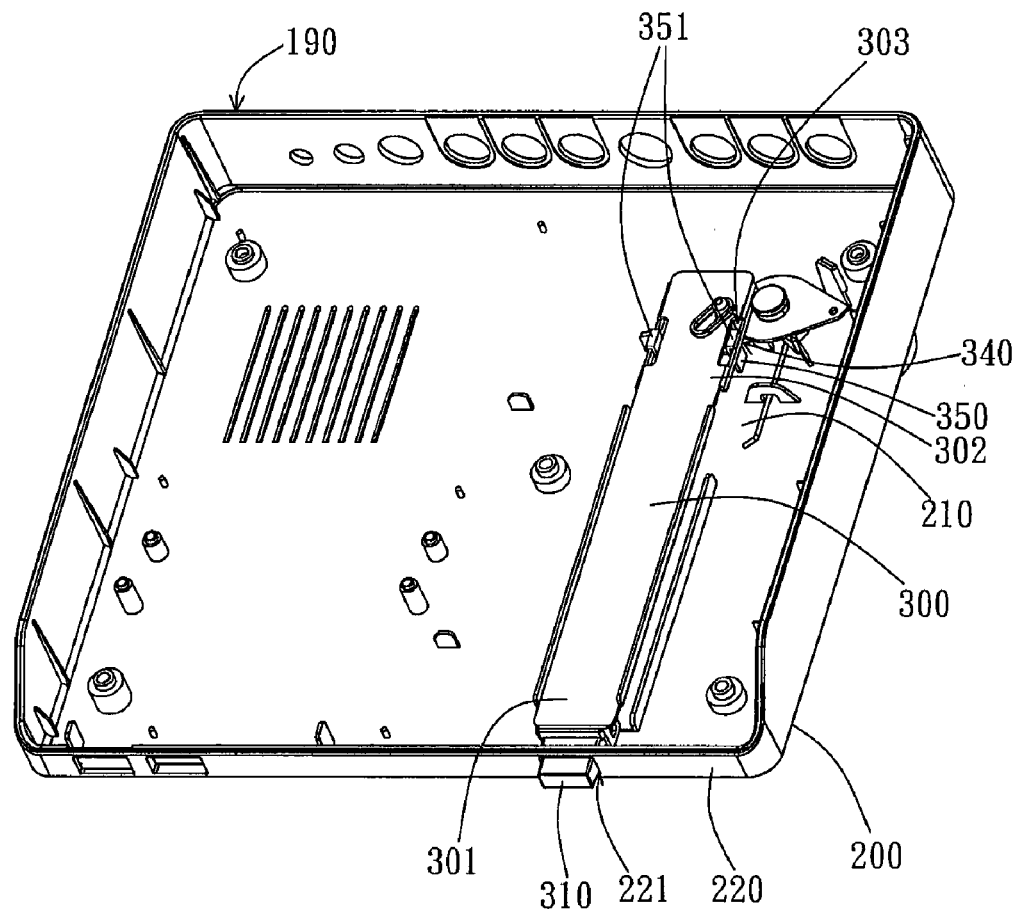
FIG. 3B shows a schematic view of a ejector in accordance with a second modified embodiment.

In the embodiment shown in FIG. 3B, the second end 302 and the first end 301 of the plate 300 maintain on a same plane. In other words, although the plate 300 is formed without any bended structure in a reversed L shape, the plate 300 still forms an accommodation space 340. Furthermore, the button 310 can be integrally mold-formed with the first end 301. For example, the plate 300 has an extending first end 301 to serve as the button 310. In such an embodiment, the extension spring 330 is disposed in the accommodation space 340 under the plate 300 when the plate 300 connects to the surface 210 of the housing 200 of the body 190 by the extension spring 330. In other words, the extension spring 330 is disposed between the plate 300 and the surface 210 of the housing 200 of the body 190. However, in alternative embodiments, the plate 300 can be made of heavier material (e.g. metals including iron, sliver, etc.) to be stably attached to the surface 210.

Figure 3C:
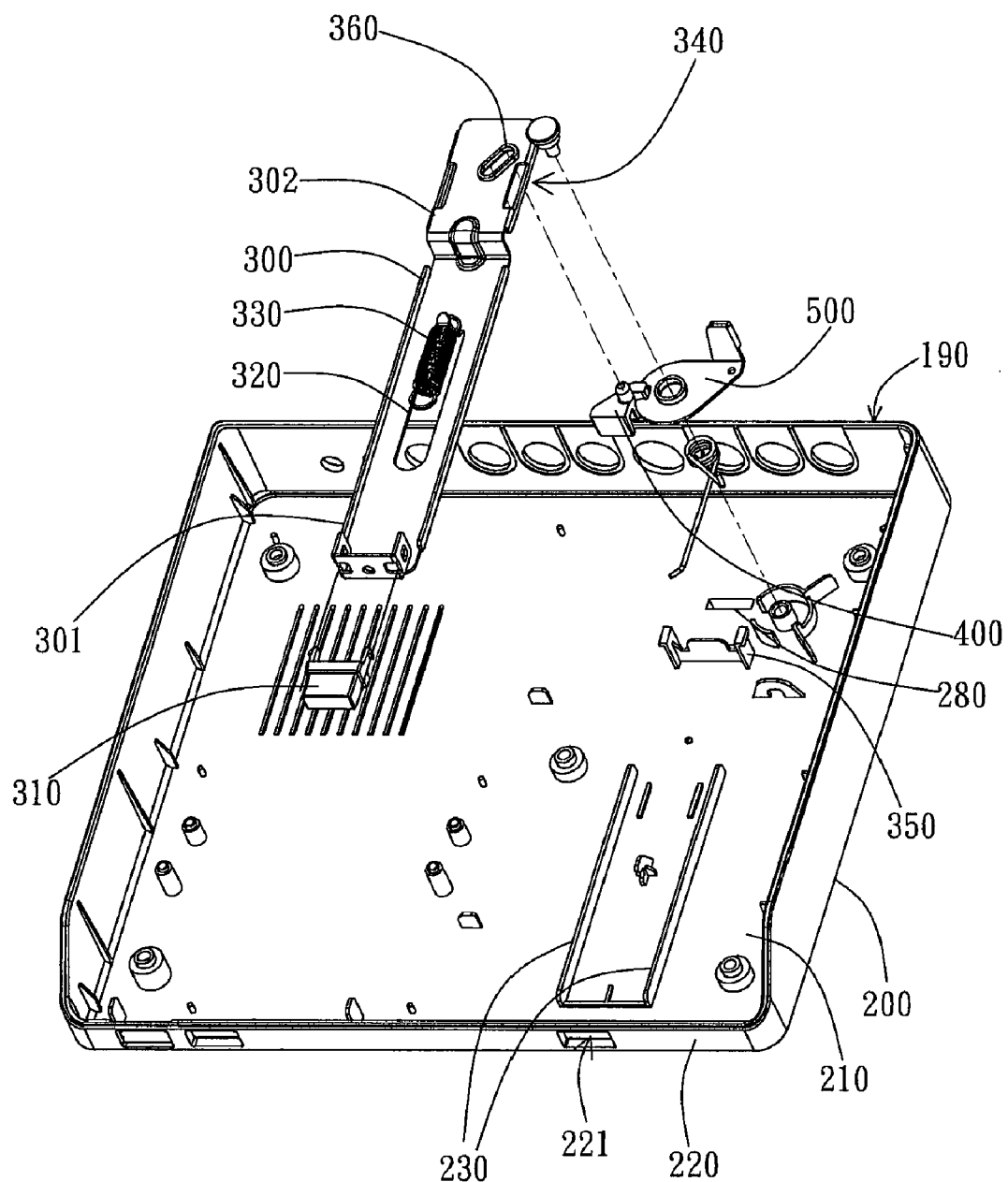
FIG. 3C shows a schematic view of a ejector in accordance with a third modified embodiment.

In the embodiment shown in FIG. 3C, the ejector further includes a groove 280 being defined on the housing 200 of the body 190. The groove 280 can be used to replace the guide plate 240. The first block 400 moves in the groove 280 when the first pin 420 moves from the first end to the second end. Thus, the groove 280 restrains the first block 400 to move or shift only along one direction (e.g. the lateral direction), i.e. the lengthwise direction of the groove 280. The groove 280 is formed on the surface 210 of the housing 200 of the body 190 corresponding to the plate 300. The first block 400 is disposed between the plate 300 and the surface 210 of the housing 200 of the body 190. The first block 400 is slidably disposed in the groove 280. In other words, when the first pin 420 moves from the first end to the second end of the guiding slot 360, the groove 280 will guide the first block 400 to shift along the extending direction of the groove 280.

In alternative embodiments, the shaft (not shown) can be upwardly screwed to position the first rotating unit 500 and the spring 600 from the surface 210 of the housing 200 of the body 190. However, in another embodiment, the surface 210 of the housing 200 of the body 190 can be designed with an indent (not shown) to accommodate the spring 600 in accordance with the size of the spring 600 (not shown). The indent acts to hold the position of the spring 600. In this case, even if the ejector is provided without any shaft 640, the spring 600 still can drive the first stem part 510 to move from the third location C to the fourth location D with the indent serving as the rotation axle.

Figure 3D:
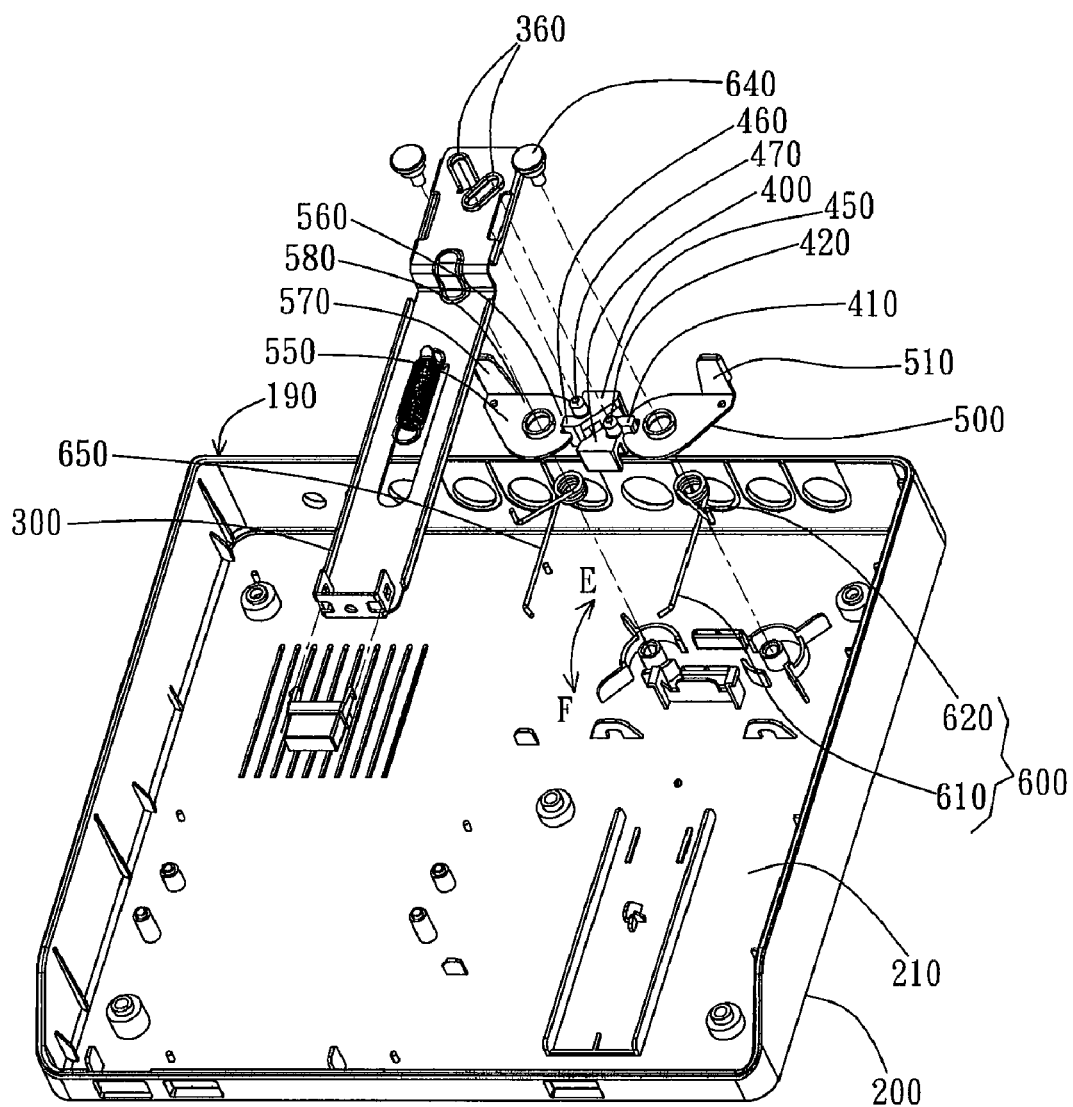
FIG. 3D shows a schematic view of a ejector in accordance with a fourth modified embodiment.
Figure 3E:
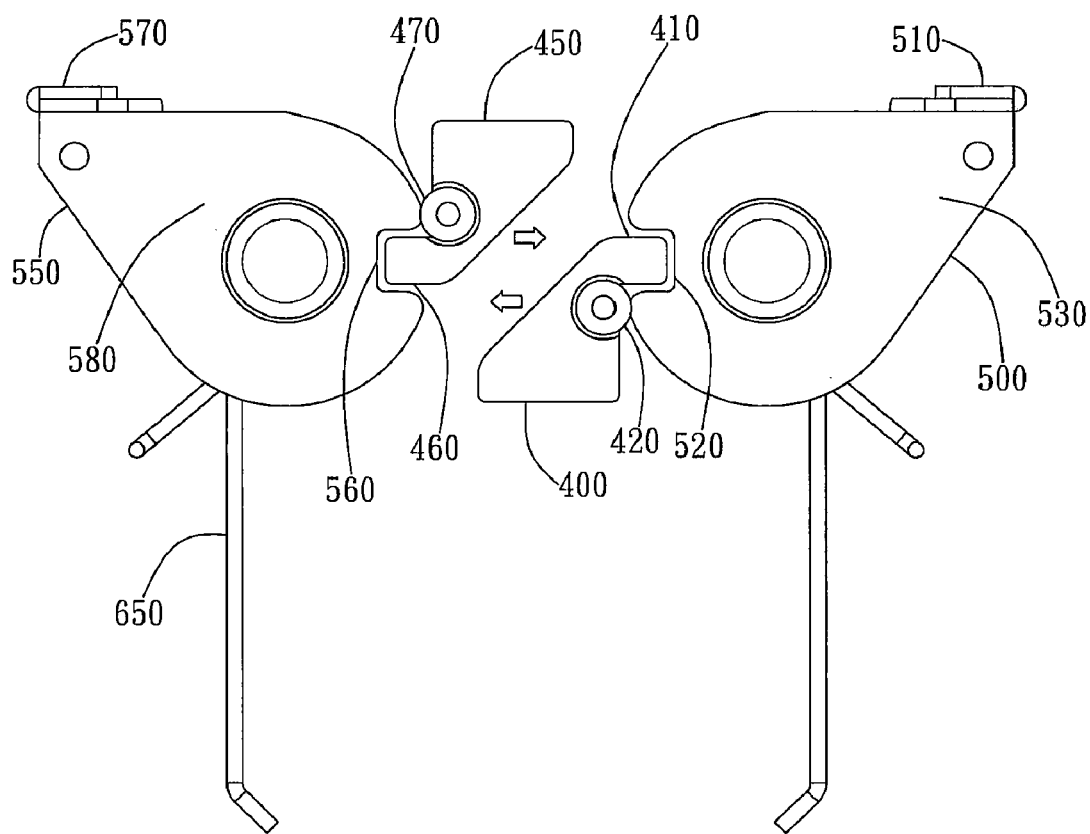
FIG. 3E shows a schematic view of operations of the fourth modified embodiment.

In the embodiment shown in FIG. 3D, the ejector of the present invention further includes a second rotating unit 550 and a third elastic member 650. In this case, the second rotating unit 550 is formed and functions similar to the first rotating unit 500. The second rotating unit 550 has a second base part 580 connected to a second stem part 570. The second base part 580 has a second notch 560 formed thereon. In this case, a second block 450 has a second engaging part 460 and a second pin 470. The second pin 470 is disposed in another guiding slot 360. In this case, two guiding slots 360 are arranged in a form of V-shape. When the plate 300 moves from the first location A to the second location B, as shown in FIG. 3E, the first block 400 and the second block 450 are guided by the V-shaped guiding slots 360 and the guide plate 240 or the groove 280 to shift along the extending direction of the guide plate 240 or the groove 280. In the meantime, the first notch 520 of the first base part 530 and the second notch 560 of the second base part 580 are disengaged from the first engaging part 410 and the second engaging part 460, respectively. Consequently, since the second stem part 570 driven by the third elastic member 650 moves from a fifth location E to a sixth location F, the external device 800 can be ejected from the housing 200 of the body 190.

Figure 4A:
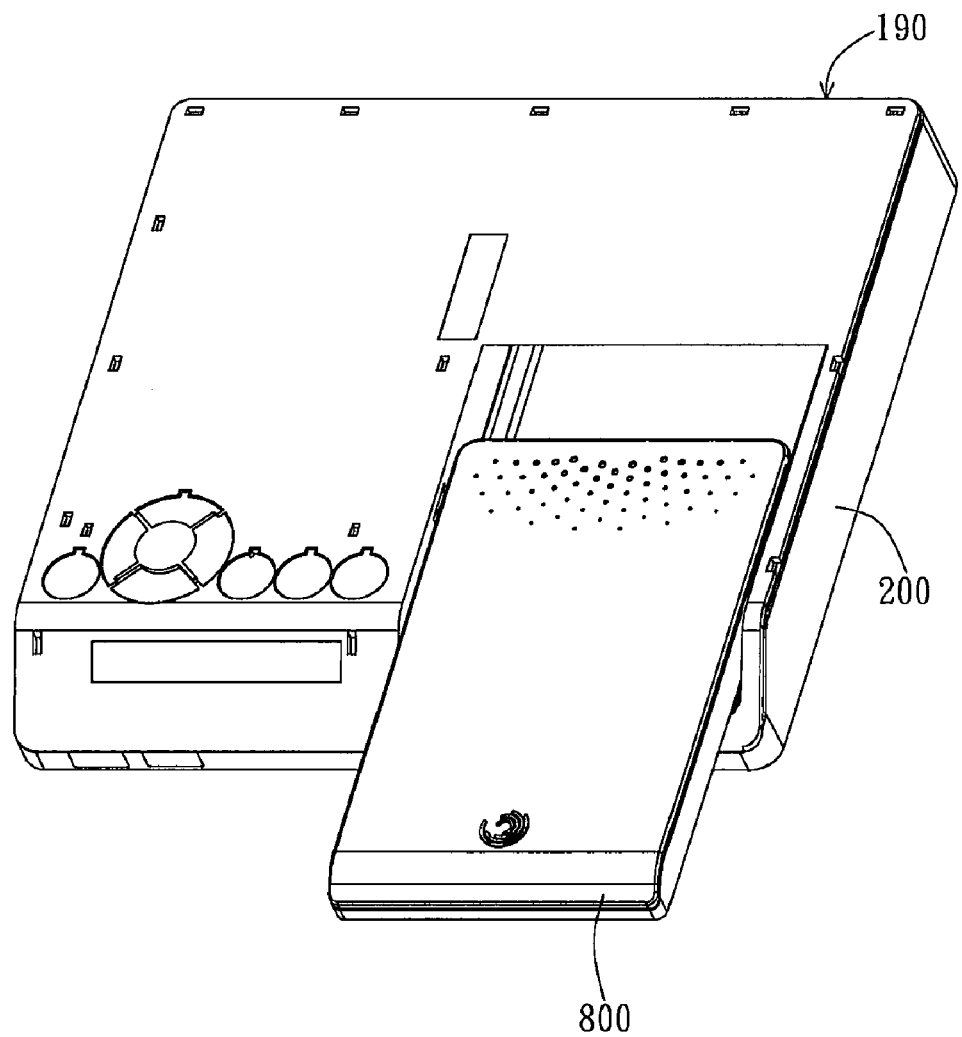
FIG. 4A shows a schematic view of an external device connecting to a housing of the body in accordance with an embodiment.
Figure 4B:
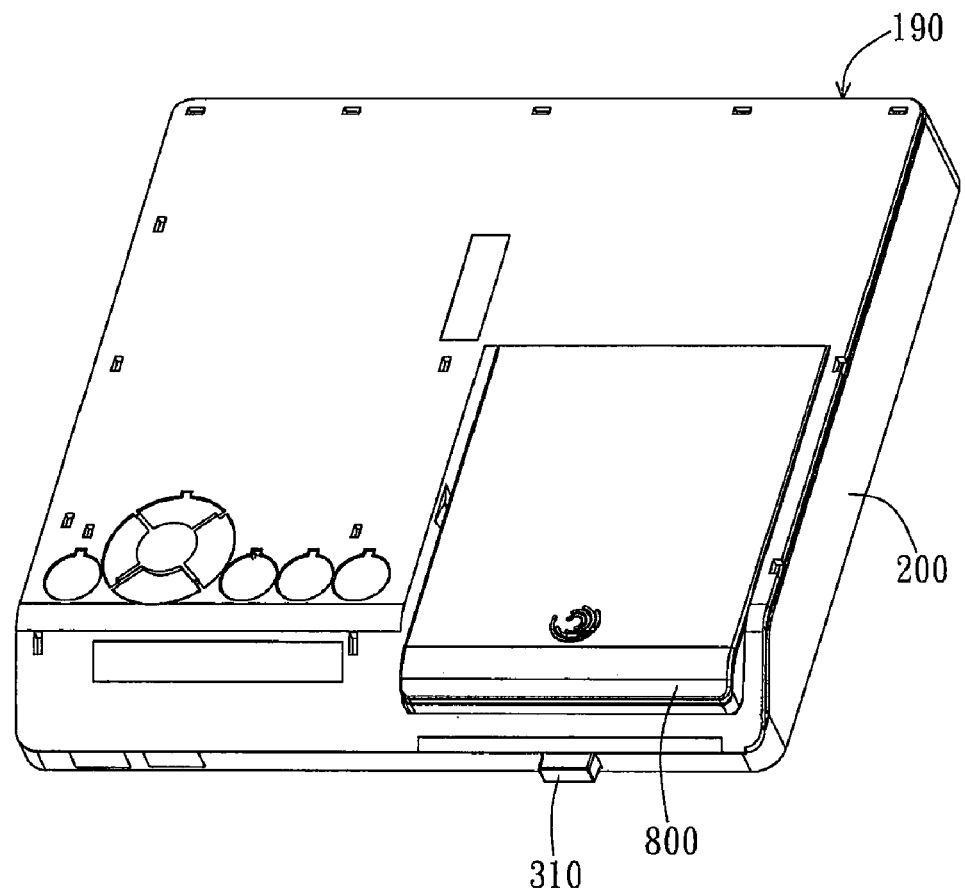
FIG. 4B shows a schematic view of an external device assembled with a housing of the body in accordance with an embodiment.
Figure 4C:
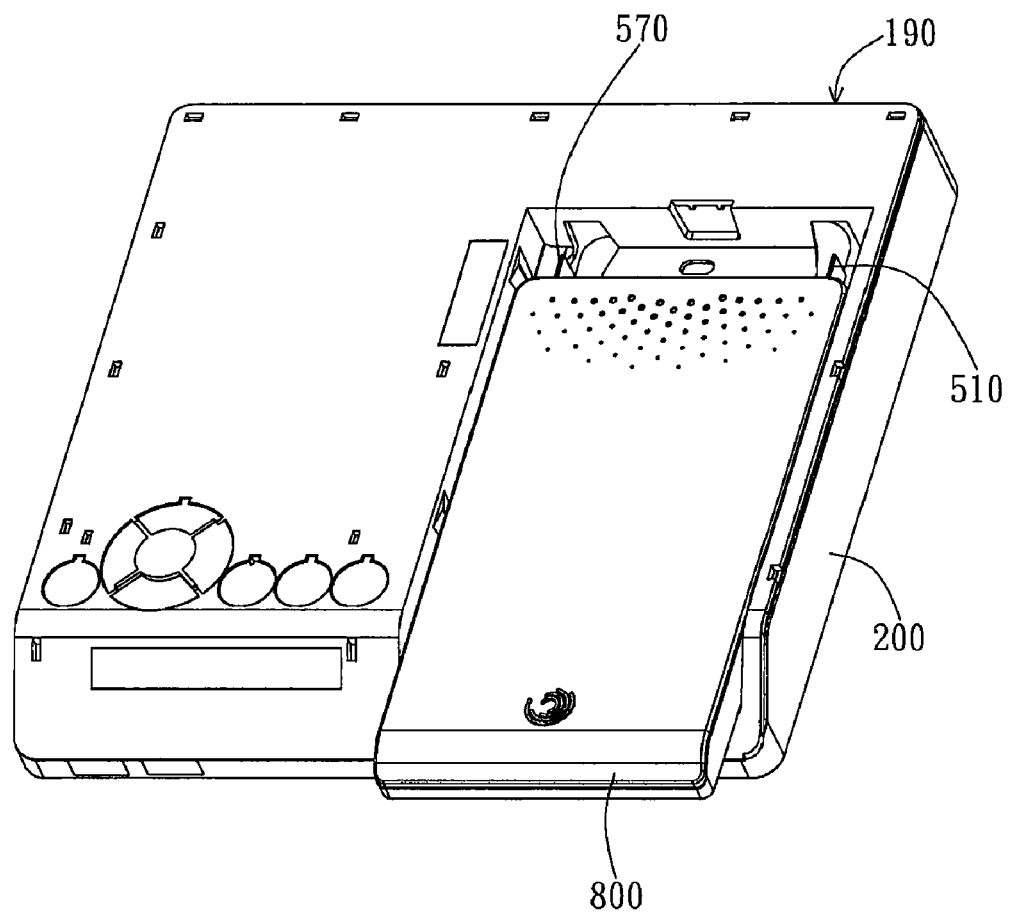
FIG. 4C shows a schematic view of an external device detaching from a housing of the body in accordance with an embodiment.

In the embodiment shown in FIG. 4A, the external device 800 is inserted into the housing 200 of the body 190 along a groove and connects with the housing 200 of the body 190. In the embodiment shown in FIG. 4B, when the external device 800 connects with the housing 200 of the body 190, the data in the external device 800 can be transferred to or processed by a central processing unit (CPU) of the electronic device 800. After the user presses the button 310, the plate 300 moves from the first location A to the second location B. As a result, the first stem part 510 and the second stem part 570 move from the third location C to the fourth location D and from the fifth location E to the sixth location F, respectively. As shown in FIG. 4C, after the first stem part 510 and the second stem part 570 push against the external device 800, the external device 800 is disengaged and ejected from the housing 200 of the body 190.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electronic device capable of ejecting an external device, the electronic device comprising:
    a body having a housing;
    a first elastic member;
    a plate, connecting to the body through the first elastic member in the housing of the body, wherein the plate is formed with at least one guiding slot, and the plate is movable between a first location and a second location;
    a first block, having a first engaging part and a first pin, wherein the first pin is disposed in the guiding slot;
    a first rotating unit, having a first base part and a first stem part, wherein the first base part is formed with a first notch, and the first stem part is moveable between a third location and a fourth location; and
    a second elastic member, connecting to the body and the first rotating unit, wherein when the plate moves from the first location to the second location, the first pin of the first block moves from a first end of the guiding slot to a second end of the guiding slot, the first engaging part is disengaged from the first notch, and the first stem part is moved from the third location to the fourth location.

2. The electronic device of claim 1, wherein a groove is defined on the body, and the first block moves in the groove when the first pin moves from the first end to the second end.

3. The electronic device of claim 1, further comprising a guide plate disposed on the body and engaging with the first block, wherein the first block moves along the guide plate when the first pin moves from the first end to the second end.

4. The electronic device of claim 1, wherein the second elastic member includes a spring having a first end and a second end, the second end of the spring connects to the first base part, and the first end of the spring connects to the body.

5. The electronic device of claim 1, wherein the first rotating unit further comprises a shaft, and the shaft is connected to the first base part and the second elastic member.

6. The electronic device of claim 1, wherein the plate further includes a protruding portion, wherein the first elastic member connects to the protruding portion and the body.

7. The electronic device of claim 1, wherein the plate further has a first opening, and the first elastic member connects to the plate and the body via the first opening.

8. The electronic device of claim 1, wherein the plate has a first end, the first end connects to a button, a surface of the body corresponding to a position of the button is formed with a second opening, the button protrudes from the body through the second opening.

9. The electronic device of claim 1, wherein the body further has a positioning groove, wherein the plate moves between the first location and the second location along the positioning groove.

10. The electronic device of claim 1, further comprising an engaging part, wherein one end of the engaging part is disposed on the body, and the other end of the engaging part engages with the plate to restrain the plate to move between the first location and the second location.

11. The electronic device of claim 10, wherein the plate corresponding to the engaging part is formed with a second groove, the engaging part has a plate guide, the plate guide slidably engages with the second groove to restrain the plate to move between the first location and the second location.

12. The electronic device of claim 1, wherein the housing of the body further is formed with at least a third opening, and the first stem part protrudes from the third opening.

13. The electronic device of claim 1, further comprising a second rotating unit and a third elastic member, wherein the second rotating unit includes a second base part and a second stem part, the second base part has a second notch, when the plate moves from the first location to the second location, the second stem part rotates from a fifth location to a sixth location.

14. The electronic device of claim 13, further comprising a second block, a second engaging part, and a second pin, wherein the second pin is disposed in at least one guiding slot, when the plate moves from the first location to the second location, the second engaging part is disengaged from the second notch.

* * * * *